(No Model.) 4 Sheets—Sheet 1.
J. W. THOMPSON & J. LLOYD.
Seed Planter and Cultivator.
No. 232,911. Patented Oct. 5, 1880.
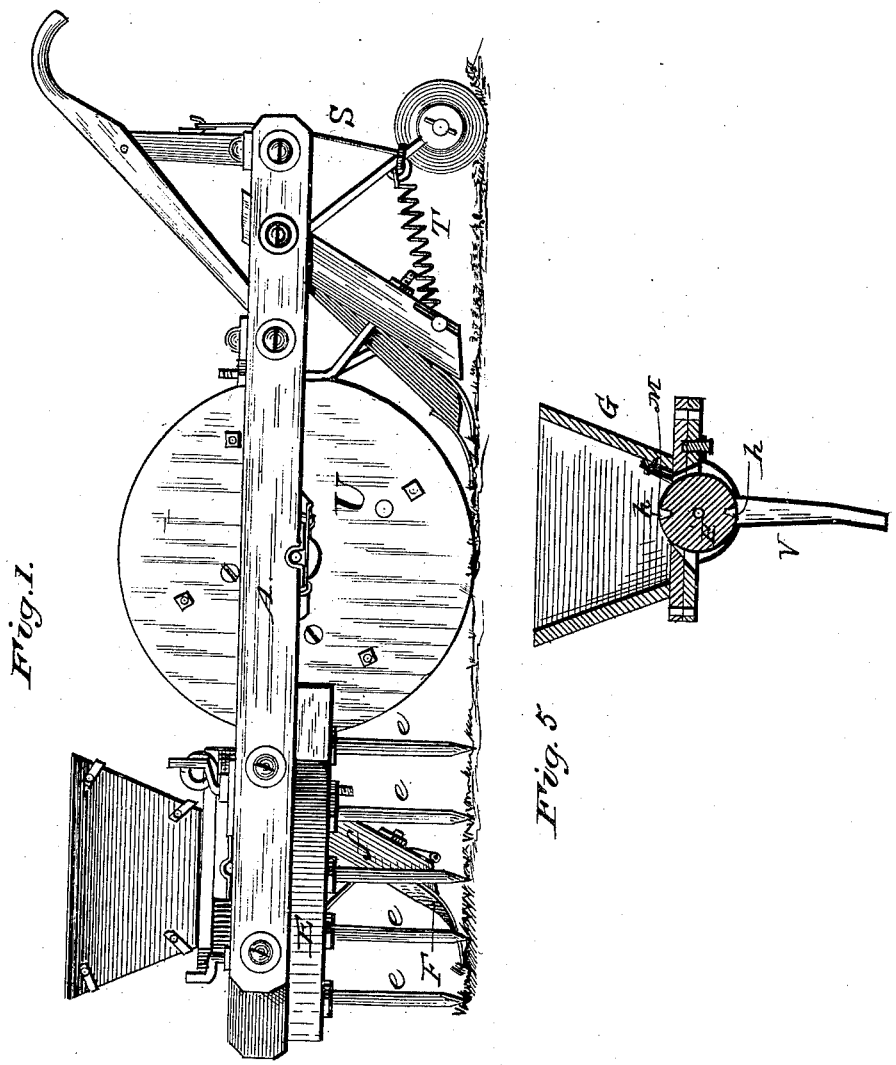
Witnesses.
Fred G. Dieterich
Albert H. Krause
Inventors
James W. Thompson
James Lloyd
by Daniel Breed.
Atty (No Model.) 4 Sheets—Sheet 2.
J. W. THOMPSON & J. LLOYD.
Seed Planter and Cultivator.
No. 232,911. Patented Oct. 5, 1880.
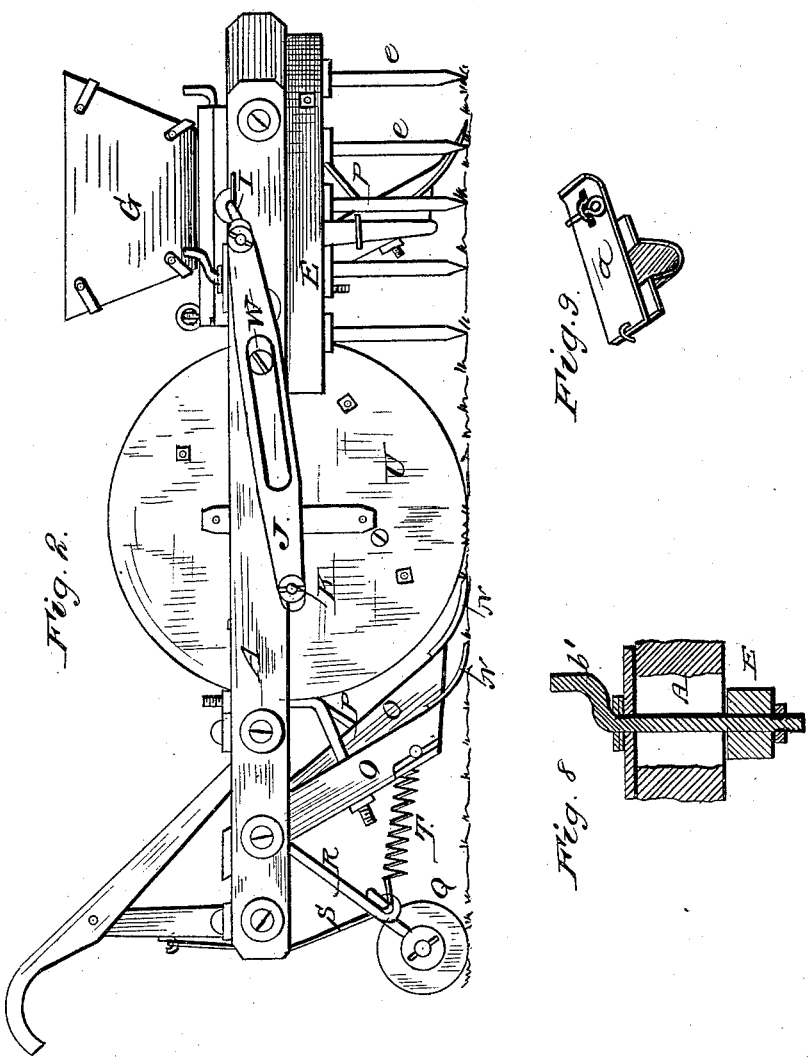

(No Model.) 4 Sheets—Sheet 3.
J. W. THOMPSON & J. LLOYD.
Seed Planter and Cultivator.
No. 232,911. Patented Oct. 5, 1880.
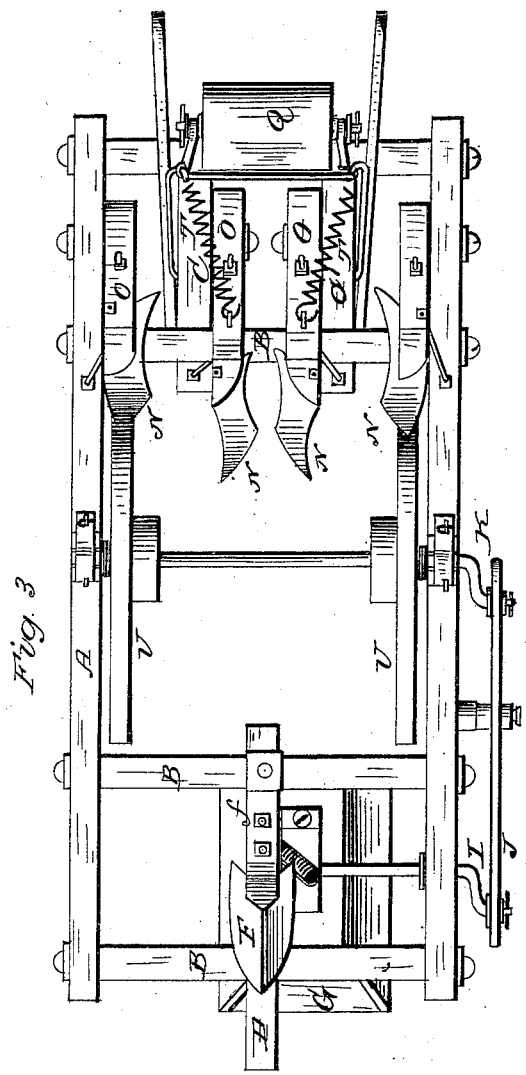
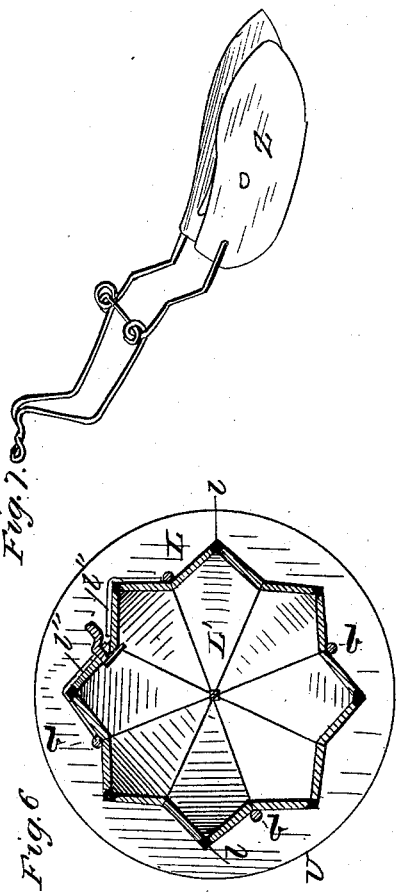

(No Model.) 4 Sheets—Sheet 4.
J. W. THOMPSON & J. LLOYD.
Seed Planter and Cultivator.
No. 232,911. Patented Oct. 5, 1880.
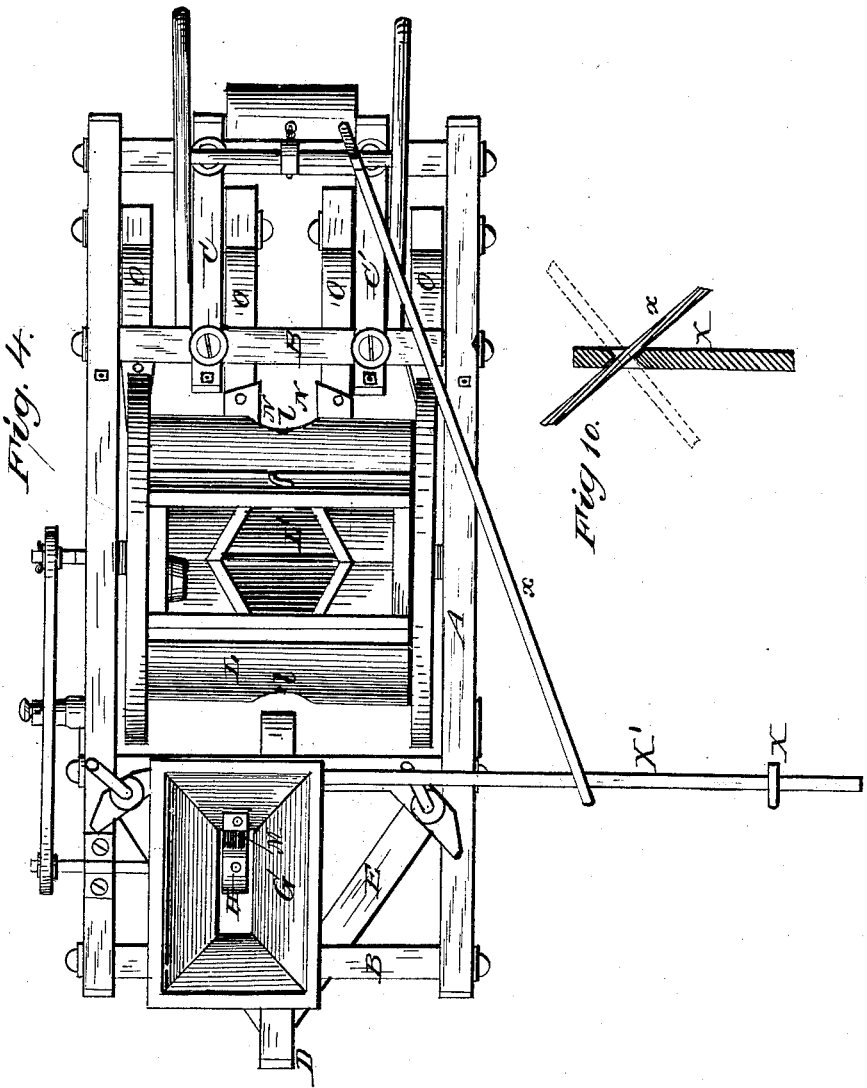
Witnesses
Albert H C Krause
Fred G Dieterich
Inventors
James W. Thompson
James Lloyd
by Daniel Breed
atty
N. PETERS, PHOTO-LITHOGRAPHER, WASHINGTON, D. C.

UNITED STATES PATENT OFFICE.

JAMES W. THOMPSON AND JAMES LLOYD, OF AUSTIN, TEXAS.

SEED-PLANTER AND CULTIVATOR.

SPECIFICATION forming part of Letters Patent No. 232,911, dated October 5, 1880.

Application filed May 8, 1880. (No model.)

*To all whom it may concern:*

Be it known that we, JAMES W. THOMPSON and JAMES LLOYD, citizens of the United States of America, residing at Austin, in the county of Travis and State of Texas, have jointly invented certain new and useful Improvements in Seed-Planters and Cultivators; and we do hereby declare the following to be a description thereof, such as will enable persons skilled in the art to make and use the same, reference being had to the accompanying drawings, and to letters of reference marked thereon, which form part of this specification.

Our invention relates to combined seed-planters and cultivators intended for different kinds of seeds and crops; and it consists of a novel construction of machine having a detachable harrow and seed-drum, and being what we call a "universal seed-planter and cultivator," all of which will be fully understood by the following description.

In the accompanying drawings, Figure 1 is a side view of our machine with the seed-hopper and also the seeding-drum attached to the frame. Fig. 2 is a view of the opposite side of the machine, showing the connecting-rod and cranks for operating the seed-roller in the forward hopper. Fig. 3 is a bottom view of the machine. Fig. 4 is a top view. Figs. 5, 6, 7, 8, 9, and 10 are detached views.

Our machine is mounted upon wheels U, Fig. 1, to regulate the depth of the working. The frame is made very strong, having side pieces, A, four cross-pieces, B, and three short bars, C, C', and D, all securely bolted together, so as to hold the whole frame very rigidly under strain in planting and working the ground. Attached to the front of this frame is a harrow, E, provided with teeth $e$, Fig. 1, and also a furrow-opener or share, F, with its shank $f$ attached to bar D of the frame. This central plow opens the furrow for the seed, which may be dropped from hopper G, which is provided with a seed-roller, H, having a series of cups, $h$, for measuring, and thus regulating the amount of seed to be dropped in a hill. A brush, M, serves to cut off the excess of seed from cups $h$ as the roller H revolves, and the seed in falling passes through tube V, thus reaching the furrow just behind the opener F.

The roller H is operated by crank K and pitman J, which is slotted and works on the roller W, provided with a rubber surface to prevent jar and noise.

The hopper G and other devices just described are employed for planting corn and similar seeds; but for planting other seed our machine is supplied with a drum-hopper, L, Fig. 6, both hoppers being removable. The drum L is placed between and attached to the wheels U, which support and carry the frame, the drum being provided with bolts $b$, passing through the wheels U, and provided with nuts. By removing these bolts the chamber of the drum may be removed from the wheels U when desired.

A cross-section of the chamber of the drum is shown in Fig. 6, the same being star-shaped, having angular or V shaped projections $l$ and central seed-holes, and also doors $l''$, for the introduction of the seed. This drum-hopper has an inner wall or chamber, L', for carrying the seed and directing the same to the central seed-holes.

The machine carries four shares or hoes, N, all of which may be used for cultivating, and reversed, if desired, to turn the furrow in the opposite direction.

In planting corn the two outer shares are removed and the two inner ones used to cover the seed. A roller, Q, follows to roll down the loose earth and crush the clods. This roller has drag-rods R and coiled springs T, and also an adjustable supporting-rod, S, all of which hold the roller to its work, and yet allow the proper sway in passing stones or other obstructions.

Our machine may be provided with a plant-shield, Fig. 7, to be attached, in the usual way, to the under side of the frame, and to travel between and just behind the two inner shares or hoes, N, in order to prevent clods or lumps of dirt from being thrown inward upon the young plants; and a row-marker, X, Fig. 4, is used for laying off the rows at equal distances. This marker is made reversible, and may be attached to either the right side or left hand of the machine. It is held in place by an arm, X', and a brace-rod, $x$, as seen in Fig. 4.

The cultivator-shares are exchangeable, and may be set to throw the earth either toward or from the row of plants. The two outer ones are removed in planting. The harrow also may be removed, when desired. The teeth of the harrow are so placed that each alternate tooth travels directly in front of one of the cultivator-shares, thus clearing the track of trash or rubbish and of clods or lumps of dirt.

The harrow is attached to the frame A by means of screw-bolts $b'$, Fig. 8, provided with a crank, so as to be easily turned without a wrench, and the shaft or axle of the wheels U has bearings on the under side of the frame, and is locked in place by simple clasps $a$, Fig. 9.

Having described our invention, what we claim is—

In a combined seed-planter, cultivator, and harrow intended for planting different kinds of seed, requiring different hoppers, the frame A B, mounted on wheels U, in combination with the removable drum L, substantially as and for the purposes set forth.

In testimony whereof we hereto affix our signatures in presence of two witnesses.

J. W. THOMPSON.
JAMES LLOYD.

Attest:
A. NEIL, Sr.,
H. L. BENTLEY.